(12) United States Patent
Van Setten et al.

(10) Patent No.: US 9,317,307 B2
(45) Date of Patent: Apr. 19, 2016

(54) SYSTEM AND METHOD FOR SYSTEM AUTOMATION BASED ON INTERPRETING A TREE SEQUENCE OF OPERATIONS

(75) Inventors: Barry Van Setten, Bad Soden-Salmuenster (DE); Christian Romeis, Essen (DE); Christian Haeske, Willich (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 804 days.

(21) Appl. No.: 13/513,395

(22) PCT Filed: Oct. 28, 2010

(86) PCT No.: PCT/EP2010/066366
§ 371 (c)(1),
(2), (4) Date: Sep. 11, 2012

(87) PCT Pub. No.: WO2011/067047
PCT Pub. Date: Jun. 9, 2011

(65) Prior Publication Data
US 2013/0006392 A1 Jan. 3, 2013

(30) Foreign Application Priority Data

Dec. 4, 2009 (EP) .................................... 09178073

(51) Int. Cl.
*G06F 9/455* (2006.01)
(52) U.S. Cl.
CPC .................................. *G06F 9/45508* (2013.01)
(58) Field of Classification Search
None
See application file for complete search history.

(56) References Cited

U.S. PATENT DOCUMENTS

| 5,263,124 | A | * | 11/1993 | Weaver et al. ................. 382/159 |
|---|---|---|---|---|
| 6,735,764 | B2 | | 5/2004 | Nakai |
| 6,788,077 | B2 | | 9/2004 | Hamdan |
| 7,610,578 | B1 | | 10/2009 | Taillefer et al. |
| 8,316,356 | B2 | | 11/2012 | Frey |
| 2003/0167096 | A1 | * | 9/2003 | Nakai ............................ 700/86 |
| 2003/0208351 | A1 | | 11/2003 | Hartman et al. |
| 2006/0031715 | A1 | * | 2/2006 | Klein et al. ..................... 714/23 |
| 2007/0006188 | A1 | * | 1/2007 | Schroth et al. ................ 717/140 |
| 2009/0182437 | A1 | * | 7/2009 | Frey ................................. 700/2 |

FOREIGN PATENT DOCUMENTS

| JP | 4-205423 | 7/1992 |
|---|---|---|
| JP | 2003-256203 | 9/2003 |

(Continued)

OTHER PUBLICATIONS

Office Action for JP 2012-541375 mailed on Aug. 8, 2014 [translation included].

(Continued)

*Primary Examiner* — Sean Schechtman
*Assistant Examiner* — Steven Garland
(74) *Attorney, Agent, or Firm* — Smith, Gambrell & Russell, LLP

(57) ABSTRACT

The invention relates to a system and method for automating a system wherein an interpreter generates and executes an execution code based on instructions received in form of a tree sequence, and wherein the tree sequence comprises information of parallel operations to define the respective automation procedure. The definition of the tree sequence may be based on a standardized human and machine readable format, such as e.g. an XML document.

24 Claims, 10 Drawing Sheets

(56) References Cited

FOREIGN PATENT DOCUMENTS

| JP | 2009-501984 | 1/2009 |
|----|-------------|--------|
| WO | 03/054561   | 7/2003 |

OTHER PUBLICATIONS

PCT Written Opinion of the International Searching Authority (Form/ISA/237) for PCT/EP2010/066366 issued Jun. 4, 2012 (in English language).

PCT Notification Concerning Transmittal of International Preliminary Report on Patentability (Form PCT/IB/326) for PCT/EP2010/066366 mailed Jun. 14, 2012 (in English language).

PCT International Preliminary Report on Patentability (Form PCT/IB/373) for PCT/EP2010/066366 issued Jun. 5, 2012 (in English language).

"IEEE Standard for Automatic Test Markup Language (ATML) for Exchanging Automatic Test Equipment and Test Information via XML; IEEE Std 1671-2006", IEEE Standard, IEEE, Piscataway, NJ., USA, Feb. 14, 2009, pp. C1-89, XP017604230, ISBN: 978-0-7381-5901-0.

International Search Report for PCT/EP2010/066366 mailed Feb. 9, 2011 (in English).

* cited by examiner

| sequence | | |
|---|---|---|
| ① | step comment=Log start experiment | |
| ② | step comment=call step set start conditions | |
| ③ | step | |
| | = comment | calibrate massflow controller and goto start temperature |
| | { } call_step | calibrate massflow-controller |
| | { } call_step | goto_starttemperature |
| ④ | step comment=Calibraion beendet, Bypasswerte von den kaltmes.. | |
| ⑤ | step comment=call step light_off test | |
| ⑥ | step comment=call step light_down_steps | |
| ⑦ | step comment=log test ready | |

| callable_steps | | |
|---|---|---|
| ① | callable_step name=set_start_conditions | |
| ② | callable_step name=light_off_steps | |
| ③ | callable_step name=light_off_steps | |
| ④ | callable_step | |
| | = name | goto_starttemperature |
| | step(5) | |
| ⑤ | callable_step | |
| | = name | calibrate_massflow-controller |
| | step(6) | |
| ⑥ | callable_step name=set_valves_in_bypass | |
| ⑦ | callable_step name=set_valves_to_reactor | |
| ⑧ | callable_step name=C_CO2BYA1500_calibration | |
| ⑨ | callable_step name=C_O2_BYA1500_calibration | |
| ⑩ | callable_step name=C_NO_BYA1500_calibration | |
| ⑪ | callable_step name=C_CO_BYA1500_calibration | |
| ⑫ | callable_step name=calibrate_HC_massflowcontrollers | |
| ⑬ | callable_step name=C_LHCBYA1500_calibration | |
| ⑭ | callable_step name=C_LHCBYA1501_calibration | |
| ⑮ | callable_step name=running_average | |
| ⑯ | callable_step name=prepare_HC_MFC | |

Fig. 7

| callable_step | | | | | |
|---|---|---|---|---|---|
| | = name | calibrate_massflowcontroller | | | |
| | step ① | = comment | set Calibration_ready tag to 0 | | |
| | | set_tags | set_tag | { } name | Calibration_ready |
| | | | | { } formula | 0 |
| | step ② | { } call_step | set_valves_in_bypass | | |
| | step ③ | = comment | set calibration accuracy and wait times | | |
| | | set_tags | | { } name | { } formula |
| | | | | 1 calibration_accuracy_CO | 10 |
| | | | | 2 calibration_accuracy_THC | 10 |
| | | | | 3 calibration_accuracy_NOX | 10 |
| | | | | 4 calibration_accuracy_O2 | 0.1 |
| | | | | 5 calibration_accuracy_CO2 | 0.1 |
| | | | | 6 wait_time_CO2_change | 30 |
| | | | | 7 wait_time_O2_change | 30 |
| | | | | 8 wait_time_NO_change | 30 |
| | | | | 9 wait_time_CO_change | 30 |
| | | | | 10 wait_time_C3T_change | 30 |
| | | | | 11 wait_time_LHC500_change | 30 |
| | | | | 12 wait_time_LHC501_change | 30 |
| | | | | 13 number_of_calibration_trials | 15 |
| | | | | 14 wait_time_first_calibration | 300 |
| | step ④ | = comment | set total flow | | |
| | | set_tags | set_tag | { } name | VOFEXHSPMF500 |
| | | | | { } formula | T[VOFEXHPAMF500_] |
| | step ⑤ | = comment | running average for HC and calibrate gasses in parallel | | |
| | | { } call_step | running average | | |
| | | { } call_step | calibrate_HC_massflowcontrollers | | |
| | | { } call_step | C_CO2BYA1500_calibration | | |
| | | { } call_step | C_O2_BYA1500_calibration | | |
| | | { } call_step | C_NO_BYA1500_calibration | | |
| | | { } call_step | C_CO_BYA1500_calibration | | |
| | step ⑥ | = comment | set Calibration_ready tag to 1 | | |
| | | set_tags | set_tag | { } name | Calibration_ready |
| | | | | { } formula | 1 |

Fig. 9

SYSTEM AND METHOD FOR SYSTEM AUTOMATION BASED ON INTERPRETING A TREE SEQUENCE OF OPERATIONS

FIELD OF THE INVENTION

The invention relates to a system and method for automating a system wherein an interpreter generates and executes an execution code based on instructions received in form of a tree sequence, and wherein the tree sequence comprises information of parallel operations to define the respective automation procedure. The definition of the tree sequence may be based on a standardized human and machine readable format, such as, e.g., an XML document.

BACKGROUND OF THE INVENTION

The task of system automation deals with the definition and execution of operations conducted by a machine or a technical industrial process. For this purpose, the system subject to automation, such as, e.g., a chemical reactor system, an automotive-function test rig, or an analytical instrument hereinafter termed plant or process to be controlled, is typically connected to at least one actuator unit, hereinafter termed actor unit, and at least one sensor unit, wherein the at least one sensor unit collects and outputs information about the plant to a controller, and the controller calculates based on received information a control signal and outputs the control signal to the at least one actor unit connected to and controlling the plant.

The respective actor unit may comprise an actuating element such as, for example, a valve, a pump or a heater, but may further comprise a distributed controller which regulates a setting of the respective actuating element at a predefined setpoint value. As such, the abovementioned controller of the automated system may be configured to output a control signal to the at least one actor unit in the form of a setpoint value, wherein the respective setpoint value represent a desired level of a value to be regulated using the respective distributed controller.

Also, the respective sensor unit may comprise a sensor element such as, for example, a thermo element, pressure sensor or pH sensor, but may further comprise estimation or filtering components used to filter the data collected by the respective sensor element, in order to improve the quality of the sensor signal or to estimate a state of the automated system by using state observer structures, such as Kalman filters or other types of dynamic filters known in the art. In this sense, the respective sensor unit collects and outputs information about the plant to a controller.

The automated system may comprise a simple or complex machine or technical process, connected to a controller unit via at least one actor unit and at least one sensor unit, and is designed and implemented to perform the task of executing some type of predefined operations, for example:

- A chemical reactor system may comprise sensor units with sensor elements such as thermo elements, pressure sensors or pH sensors, and actor units with actuating elements, such as valves, pumps, heaters, to name a few possibilities, wherein the task of the automated system may relate to chemical synthesis.
- An automotive-function test rig may comprise a number of different sensor and actor units applied in the automated system to verify or test the performance of an automotive component.
- An analytical instrument may comprise different sensor and actor units applied in an automated laboratory test equipment to determine the properties of a object or organical or inorganic compound or mixture. The properties can be chemical composition, or some physical property, or the effect the test object or compound or mixture has on another object, compound or mixture.

The controller of the automation system comprises a computing processing unit for performing calculations and possibly logical decisions, to decide how individual components, such as the actor units of the automated system, should change their settings over time. If such decisions are based on measured sensor values, the controller is said to be implemented in a closed-loop constellation, whereas decisions made in an open-loop controller are independent from any such sensor value.

It follows that the automated system executes some type of operations to fulfill a desired task, wherein the order and structure of operations is typically defined in some sequential form. Such sequences are defined in a manual or automated manner such to operate the automated system, i.e., the controller thereof, in accordance with the task involved. The so-called sequencers simplify the work of defining and applying such appropriate sequences of operations, and may be used and instructed by the operator by means of an, e.g., sequence script, sequence table or a highly configurable sequence control user interface. In this regard, the sequence information used to instruct the sequencer comprises a list of consecutively arranged operations defined as steps which are interpreted one after another by the sequencer, see, e.g., the linear scripted sequence illustrated in FIG. 1. A step usually consists of a statement to perform an action, a possible set of input parameters to customize those actions, and possibly an output value of some kind. It follows that the statement may, e.g., refer to a general software function or method. In this regard, the sequencer can be seen as an interpreter and builds a part of the automated system.

For example, the document WO 03/054561 refers to a transformer test sequence editor that enables a tester to implement test sequences with adjustable test parameters. In this regard, a test sequence engine enables a tester to perform sequences of tests and an automated test sequence editor allows the editing of the test sequence to be performed. It follows that test instructions are executed in accordance with the order provided in the edited test sequences.

However, as it is often desired to have operations run not only in a sequence but also in parallel in automated systems, take for example the task of simultaneous calibration of different machine parts, it would clearly be advantageous for the human operator of the automated system to have simple means to instruct the system and execute multiple operations in parallel. However, information received by prior art sequencers do not provide for defining operations to be executed in a parallel manner, and the operator is left with the choice between a suboptimal and time-consuming sequential execution of steps, or with the option of requesting a system integrator, e.g. the person or provider who supplied the sequencer, to use his expert know-how and advanced programming skills in, e.g., C++, Basic or Labview to program a tailored parallel calibration subroutine. By this way, the operator is barred from quickly implementing new ideas of parallel operations, and is forced to involve the system integrator and accept the respective incurred development time, costs and other inconveniences.

SUMMARY OF THE INVENTION

The object of the present invention is related to an improved or alternative system and method of system automation based on interpreting a tree sequence of operations. This object is attained with the subject-matter according to the claims.

According to one of its aspects, the present invention is related to an improved automated system comprising a controller and a plant connected by at least one actor unit and at least one sensor unit, wherein the at least one sensor unit collects and outputs information about the plant to the controller and the controller calculates based on the received information a control signal and outputs the control signal to the at least one actor unit. The controller comprises a processing unit to calculate and output said control signal by the controller, wherein the processing unit may comprise a single or a plurality of digital processors. Further comprised by the automated system, is an interpreter which generates and executes an execution code on the controller's processing unit, wherein the interpreter receives instructions in form of a or a plurality of tree sequences. The tree sequence can, e.g., be provided manually, such as in a script manually edited by the operator of the automated system, or can be generated based on operator's inputs provided in an automation design software tool, to name a few possibilities.

According to embodiments of the invention, the tree sequence is defined as a hierarchical structure of subsequences, steps and statements, which are related to each other over parent-child relationships. Said hierarchical structure starts with exactly one subsequence, called the root subsequence, that has at least one step as a child, wherein the at least one step comprises at least one statement as a child. When a subsequence contains more than one child step, then these steps are siblings of each other. When a step contains more than one child statement, then these statements are siblings of each other. Each of the respective statements is either an assignment statement defining computational or peripheral procedures to be performed by said controller, or a suspend statement that suspends the execution at the position of the suspend statement, or a control flow statement used to initiate a child subsequence. Preferably, said child subsequence has the same properties as said root subsequence, so, there is no limit on how deep the line of inheritance can go.

The execution code generated and executed by said interpreter causes the processing unit to execute the child steps initiated by each subsequence in a serial manner. The child statements initiated by each step are executed in a parallel or in a quasi-parallel manner by the processing unit. In other words, the processing unit processes sibling steps in a serial manner, and sibling statements in a parallel or quasi-parallel manner. Here, the processing unit may allow for parallel processing or quasi-parallel processing of sibling statements, wherein the quasi-parallel processing is based on running the processing unit with a high-speed processing rate, this will be described in further detail later.

The respective assignment statements are typically related to the process to be controlled, such as for instance, represent statements that may perform a calculation and set a value of an actor unit, or statements outputting a message to the process operator, or open a message box in a display requiring input from the operator suspending the executing of the parent step until the operator closes message box, or statements that adapt the properties of a data recorder, or statements that store the current actor or sensor unit values for later use.

In a preferred embodiment of the present invention, the instructions received by the interpreter are defined in XML, such as, e.g., in an XML document, and it is even more preferred to have the said instructions provided in valid XML document conforming to a schema defined in an XML schema language. It should be noted, as readily conceivable by the skilled person, that many standardized human and machine readable formats may be applicable for the same purpose.

It is preferred to use suspend statements that can suspend an execution for a specified wait time, without suspending executing of sibling statements. The specified wait time can be a time period of a certain length, or the time period the sequencer timer needs becomes a multiple of the specified wait time. The latter, can be used to synchronize parallel subsequences. As known in the art, said statements have different names in different script and programming languages. These statements could be, for example, called: wait, pause, suspend.

It is also preferred to use control flow statements to initiate new subsequences. Said control flow statements initiate new child subsequences unconditionally or conditionally. Said control flow statements are conditional control flow statements that execute or execute a child subsequence only if some condition is met, or loop control flow statements that execute a child subsequence zero or more times, until some condition is met, or distant control flow statements that execute a distant subsequence, after which the flow of control usually returns. As known in the art, said statements have different names in different script and programming languages. These statements could be, for example, called: for, while, if-then-else, repeat, subprocedure, select-case, do-while, just to name a few.

It is also preferred to give said loop control flow statements, the capability to suspend each time the child subsequence is completed, and to continue when the value of the sequencer timer becomes a multiple of the interval time that is specified for loop control control flow statement.

In a preferred embodiment of the present invention, the plant is an automotive-function test rig, in an alternative preferred embodiment of the present invention, the plant is a chemical reactor system or, in an alternative preferred embodiment of the present invention, the plant is an analytical instrument.

Preferably, the at least one sensor unit measures a rotational speed, force, temperature-value, concentration of a component, voltage, current, pressure, mass, flow rate, or the logical state of a digital output.

It is also preferred to have the automated system further comprise a display connected to the controller, wherein at least one of said statements outputs a message to a human operator of the automated system to the display. Such a display could, for example, be a TFT, LCD screen or any other type of display suitable for conveying information to the human operator.

It is also possible to have one or more electronic text messaging mediums connected to the controller, over which at least one of said statements can initiate the output of an electronic message to a human operator. As known in the art, there exist various message services, like email, SMS, Twitter, just to name a few.

In a preferred embodiment of the present invention, the generation of an execution code by the interpreter involves an intermediate step of generating an intermediate representation code. Here, the interpreter translates the instructions received in form of at least one tree sequence into some intermediate representation code and executes this.

In an alternative preferred embodiment, the at least one tree sequence received by the interpreter represents a source code which the interpreter executes directly on the processing unit.

In yet another alternative preferred embodiment, said interpreter is a linearizer that transforms the tree sequence to multiple stacks of information, and said processing unit processes said stacks of information. Said linearizer generates from said tree sequence, a stack of referenced subsequences, a stack of referenced steps, a stack of referenced statements, and stack of references to the stack of referenced subsequences which contains at the start only the reference to the root subsequence. Each statement in said stack of referenced statements contains data about the action that the statement has to perform, called statement data from now, and if said statement in said stack of referenced statements is a conditional control flow statement then said statement data contains besides for instance the condition to prove, a list with 1 or more references to a child subsequences in said stack of referenced subsequences, thereby building a 1-to-n parent-child relationship, and if said statement in said stack of referenced statements is a loop control flow statement then said statement data contains, besides for instance a loop iteration counter, a single reference to a child subsequence in said stack of referenced subsequences, thereby building a 1-to-1 parent-child relationship.

Each step in said stack of referenced steps contains a list with one or more references to child statements in said stack of referenced statements thereby building a 1-to-n parent-child relationship, and each of said lists tracks the state of said child statements, said state can be "open", "ongoing", or "completed".

Each subsequence in said stack of referenced subsequences contains a single reference to the subsequence in said stack of referenced subsequences that initiated the step that initiated the statement that initiated said subsequence, thereby building a 1-to-1 grand-grand-parent-grand-grand child relationship, and each subsequence in said stack of referenced subsequences contains a sorted list with references to child steps in said stack of referenced steps, thereby building a 1-to-n parent-child relationship, and each subsequence in said stack of referenced subsequences stores the position of the reference to the step in said list that is executed, said position is called step iterator from now, and said executed step is called active step from now, and the initial value of each step iterator being 0.

Said linearizer sends said stacks to said processing unit.

Said processing unit processes consecutively any reference in said stack of references to subsequences in said stack of referenced subsequences in a consecutive manner according to the first-in first-out (FIFO) mechanism, said stack is from now called FIFO queue.

The processing mechanism of said references to said subsequences in said FIFO queue is as follows.
1) Said processing unit obtains from said FIFO queue the next reference to a subsequence in said stack of subsequences, which is called active subsequence from now.
2) Said processing unit reads the active subsequence from said stack of subsequences.
3) Said processing unit reads the list with references to child steps from said active subsequence.
4) Said processing unit process said references to child steps as follows:
   i) Said processing unit raises said step iterator of said active subsequence by 1, thereby making the next step active.
   ii) Said processing unit reads from said list with references to child steps the reference to the active step.
   iii) Said processing unit reads the active step from said stack of referenced steps.
   iv) Said processing unit executes said active step.
   v) Depending on the status information received from the executed active step, four pathways are possible:
      a) The active step is "completed" and the iterator is smaller than the number of references to child steps in said list, in which case the processing unit returns to point 4i) of the said processing mechanism of said references to said subsequences.
      b) The active step is "open", in which case, said processing unit puts the reference to the active subsequence in the FIFO queue, and said processing unit stops the the execution of the active subsequence.
      c) The active step is "ongoing", in which case, said processing unit stops the execution of the active subsequence.
      d) The active step is "completed" and the iterator equals the number of references to child steps in said list, in which cases the processing unit writes the reference to the grand-grand-parent subsequence in the FIFO queue. If there is no reference to a grand-grand-parent then the finished subsequence is the root subsequence and the sequence is ready.

The processing mechanism of said active child steps is as follows.
1) Said processing unit receives a reference to said active step in said stack of steps.
2) Said processing unit reads the active step from said stack of steps.
3) Said processing unit reads the list with child statements from said active step.
4) Said processing unit repeats the following on all "open" child statements.
   i) Said processing unit obtains the reference to the next child statement, which is called active statement from now.
   ii) Said processing unit reads said active statement from said stack of referenced statements.
   iii) Said processing unit executes said active statement and receives back the state from said active statement. Said processing unit changes in said list with child statements of said active step the state of said active statement accordingly.
5) When all "open" child statements have been executed said processing unit has following possibilities of how to continue:
   i) Said list with references to child statements of said step contains at least one reference to a child statement "ongoing", in which case the active step reports to the parent subsequence "ongoing".
   ii) Said list with references to child statements of said step contains at least one reference to a child statement that is "open", in which case the active step reports to the parent subsequence "open".
   iii) Said list with references to child statements of said step contains only references to child statements that are "completed", in which case the active step reports to the parent subsequence "completed".

The processing mechanism of said active statement is as follows.
1) Said processing unit receives a reference to said active statement in said stack of statements.
2) Said processing unit reads the active statement from said stack of statements.
3) Said processing unit reads the statement data from said active statement.
3) Said processing unit executes said active statement if the state is "open" or "ongoing". Here three pathways are possible:
   a) Said statement is an assignment statement in which case the statement is executed completely and its parent step receives an information that said statement is "completed".

b) Said statement is a suspend statement. Said processing unit is not suspended by said suspend statement, instead said processing unit checks if the suspend statement is in suspension, in which case the parent step receives an information that the statement is "open", or if the suspension is completed, in which case the parent step receives an information that the statement is "completed".

c) Said active statement is an conditional control flow statement of which the condition is proven by the processing unit and when the condition is met, then said processing unit gets the according reference to the child subsequence from said statement data and puts it in the FIFO queue, and and the parent step receives an information that the statement is "completed".

d) Said active statement is an loop control flow statement. Said processing unit determines if a new iteration is required or not. When a new iteration is required, then said processing unit gets the according reference to the child subsequence from said statement data and puts it in the FIFO queue, and the parent step receives an information that the statement is "ongoing", When no new iteration is required, then the parent step receives an information that the statement is "completed".

It is appreciated that the described way of organizing a tree sequence in stacks of information and the subsequent processing of such stacks described in the above is exemplary and other ways are possible to organize and handle a tree sequence that lead the same way of operation. A good example of an other way is to not use the step iterator but instead delete from the active sequence in said stack of sequence the references to "completed" completed child steps. One could also organize the stack data in another way by for instance creating stacks for the different statement types. One could also lower CPU usage by really suspend execution in the case the FIFO queue only contains references to suspended subsequences, in which case the processing unit should verify how long it can suspend until it must start execution again. It should also be noted that the processing unit can be given additional tasks which are not part of the described invention. For instance, the processing could verify periodically if the user pressed a stop button to abort execution or if a sensor value is out of range in which case it could abort execution.

In a preferred embodiment of the present invention, the interpreter receives instructions in form of a plurality of tree sequences, wherein each tree sequence comprises a root sequence and whereby the processing unit executes the multiple tree sequences in parallel.

Also in a preferred embodiment of the present invention, the interpreter executes a precompiled code. Here, the interpreter explicitly executes stored precompiled code made by a compiler, wherein the compiler may build a part of the interpreter as such.

According to another aspect of the present invention, a method is provided for automating a system comprising a controller with a processing unit and a plant connected by at least one actor unit and at least one sensor unit, wherein the at least one sensor unit collects and outputs information about the plant to the controller and the controller uses the processing unit to calculate a control signal based on the received information and to output said calculated control signal to the at least one actor unit. Here, the processing unit may comprise a single or a plurality of digital processors. Further, an interpreter comprised by said automated system receives instructions in form of a or a plurality of tree sequences comprising at least one step, wherein the at least one step comprises at least one statement, wherein at least one statement is an assignment statement defining computational or peripheral procedures to be performed by said controller, or a control flow statement used to initiate a new subsequence, or a suspend statement used for suspending of execution at the position of the statement. In this regard, the respective assignment statements are typically related to the process to be controlled, such as for instance, represent statements setting a value of an actor unit, or statements outputting a message to the process operator. Based on said received instructions, the interpreter generates and executes an execution code on said processing unit. It follows that the processing unit sequentially executes the steps of each subsequence, such that each of said steps is executed until all statements comprised in the respective step have been completed, and wherein statements initiated by the same step are executed in a parallel or in a quasi-parallel manner. The tree sequence can, e.g., be provided manually, such as in a script manually edited by the operator of the automated system, or can be generated based on operator's inputs provided in an automation design software tool, to name a few possibilities.

The execution code generated and executed by said interpreter causes the processing unit to sequentially execute the steps of each subsequence. Here, each of the steps is executed by the processing unit until all statements comprised in the respective step have been completed. However, the statements initiated by the same step are executed in a parallel or in a quasi-parallel manner by the processing unit. In other words, the statements which are comprised in each individual step, are executed on the processing unit in a parallel or quasi-parallel manner. Here, the processing unit may allow for parallel processing or quasi-parallel processing of commands, wherein the quasi-parallel processing is based on running the processing unit with a high-speed processing rate.

In a preferred embodiment of the present invention, the instructions received by the interpreter are defined in XML, such as, e.g., in an XML document, and it is even more preferred to have the said instructions provided in a XML valid document conforming to a schema defined in an XML schema language. It should be noted, as readily conceivable by the skilled person, that many standardized human and machine readable formats may be applicable for the same purpose.

Here, it is also preferred to use a control flow statement for initiating said new subsequence.

In a preferred embodiment, the plant is an automotive-function test rig, in an alternative preferred embodiment, the plant is a chemical reactor system and in an alternative preferred embodiment the plant is an analytical instrument.

Also preferred is to have the at least one sensor unit measure a rotational speed, force, temperature-value, concentration of a component, voltage, current pressure, mass, flow rate, or the logical state of a digital output.

It is also preferred to have said automated system further comprise a display connected to the controller, wherein at least one of said statements outputs a message to a human operator of the automated system to the display. Such a display could, for example, be a TFT, LCD screen or any other type of display suitable for conveying information to the human operator. The automated system may further comprise an electronic messaging system, wherein at least one of said statements can output an electronic text message. Such an electronic message could, for example, be a email, sms or any other type of electronic text message.

In a preferred embodiment, the generation of an execution code by the interpreter involves an intermediate step of generating an intermediate representation code. Here, the interpreter translates the instructions received in form of a subsequence into some intermediate representation code and executes this.

In an alternative preferred embodiment, the at least one tree sequence received by the interpreter represents a source code which the interpreter executes directly on the processing unit.

In yet another alternative preferred embodiment, the said interpreter is a linearizer which generates and executes a linearized execution code based on said received at least one tree sequence. It is even more preferred to have the linearizer generate a stack of referenced data from said tree sequence, and execute said stack of referenced data on said processing unit in a synchronized manner with a high-speed processing rate to enable said quasi-parallel processing of said statements initiated by the same step.

Also in a preferred embodiment of the present invention, the interpreter executes a precompiled code. Here, the interpreter explicitly executes stored precompiled code made by a compiler, wherein the compiler may build a part of the interpreter as such.

Preferably, the processing unit uses a real-time kernel or a real-time operating system.

Another aspect of the present invention relates to a computer program when executed in a computer, which causes the above described interpreter to perform the generation and execution of an execution code in accordance with said method provided for automating a system.

Also, a preferred embodiment of present invention relates to two computer programs, where the first runs with low priority performing the generation of execution code and peripheral automation tasks like for instance data recording, or outputting data to an operator display, and where the second program runs on a realtime kernel or in a realtime operation system executing the execution code.

Yet another aspect of the present invention relates to a computer program when stored on a medium comprising the above described instructions to be received by said interpreter in form of at least one tree sequence in accordance with said method provided for automating a system.

Another aspect of the present invention provides a computer readable medium which causes a computer to have the above described interpreter receive instructions in form of at least one tree sequence and perform the generation and execution of an execution code in accordance with said method provided for automating a system.

BRIEF DESCRIPTION OF THE DRAWINGS

Preferred embodiments of the invention are described in more detail below with reference to the attached drawings, which are by way of example only.

FIG. 7 shows an XMLSpy gridview with a script that describes an automotive test;

FIG. 9 shows an XMLSpy gridview with the callable_step "calibrate_massflowcontroller";

DETAILED DESCRIPTION OF EXEMPLARY EMBODIMENTS

Figure 1:
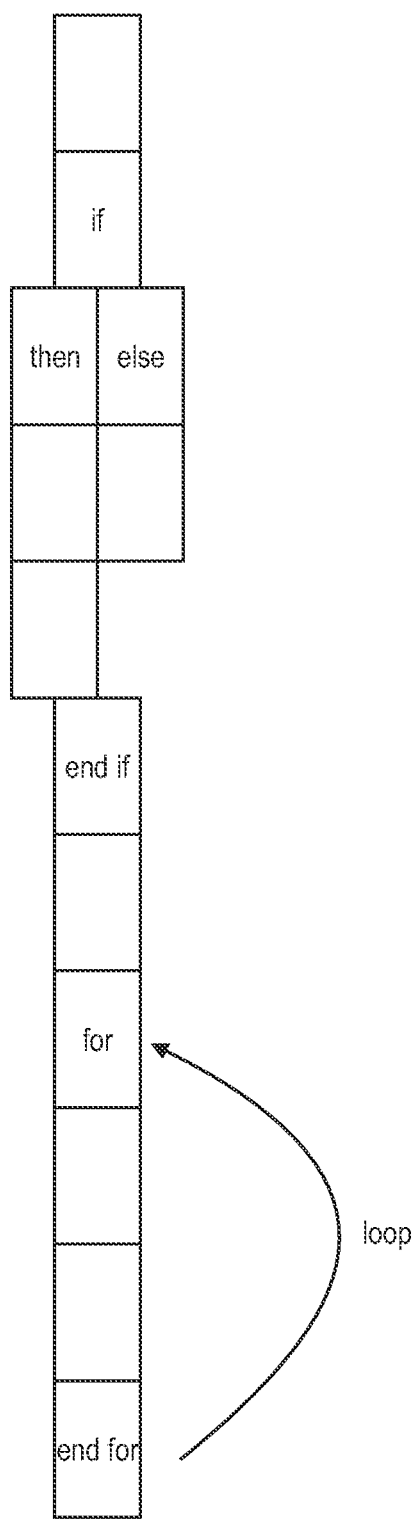
FIG. 1 shows a graphical representation of a linear scripted sequence.
Figure 2:
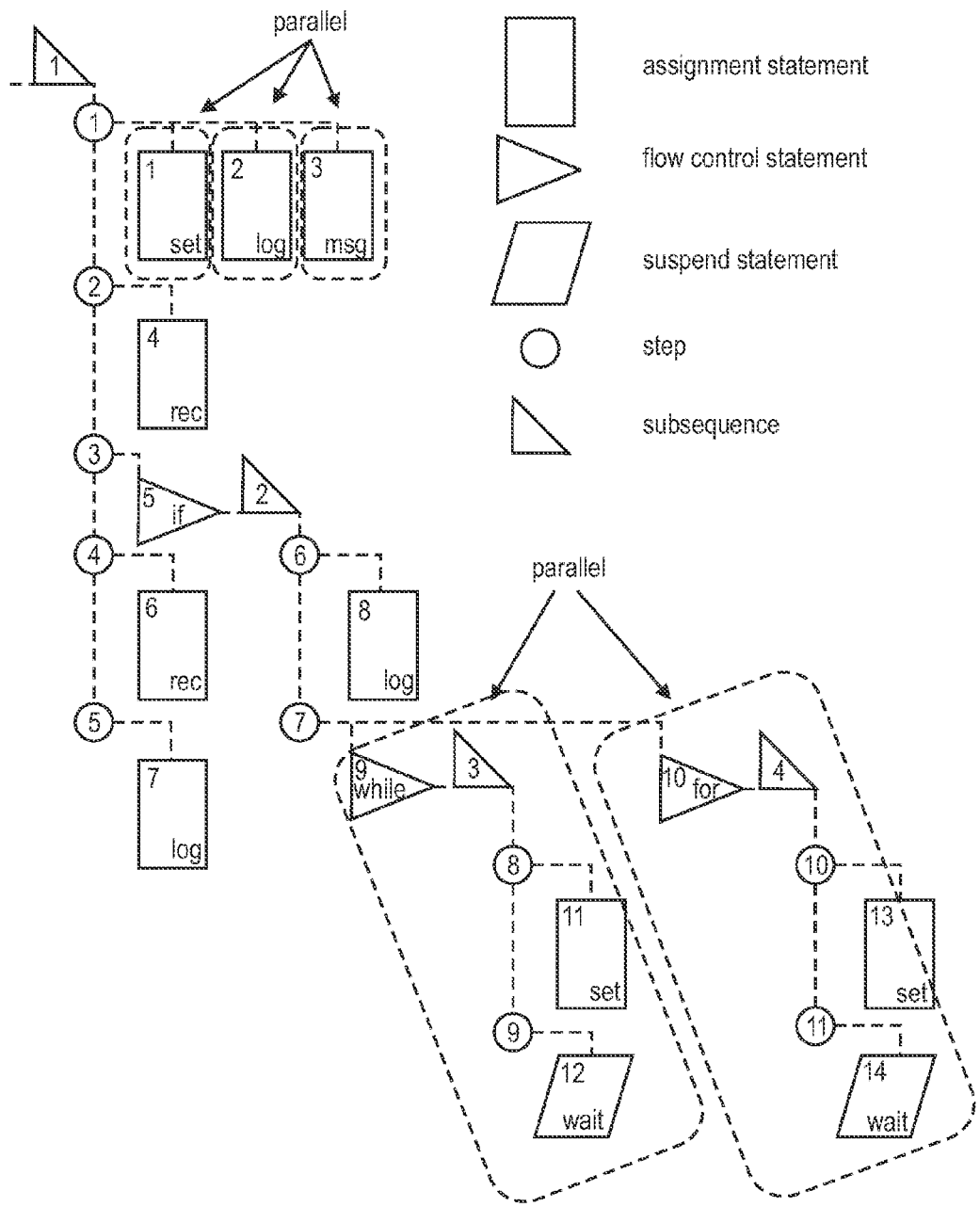
FIG. 2 shows a graphical example of a tree sequence.

In an exemplary embodiment of the present invention, the system operator defines for conducting parallel operations in an automated test bench system, a tree sequence comprising a plurality of steps, wherein each step may comprise any number of statements. FIG. 2 illustrates a possible structure of such a tree sequence, wherein the referenced statements are either assignment statements, or suspend statements, or control flow statements where the latter is used to initiate new subsequences. It is clear from the figure that the subsequences may be structured to represent a nested constellation of sequence steps, wherein each of a new subsequence is initiated by a control flow statement. Further, it can be seen that the tree sequence represents a type of a data tree.

Figure 3:
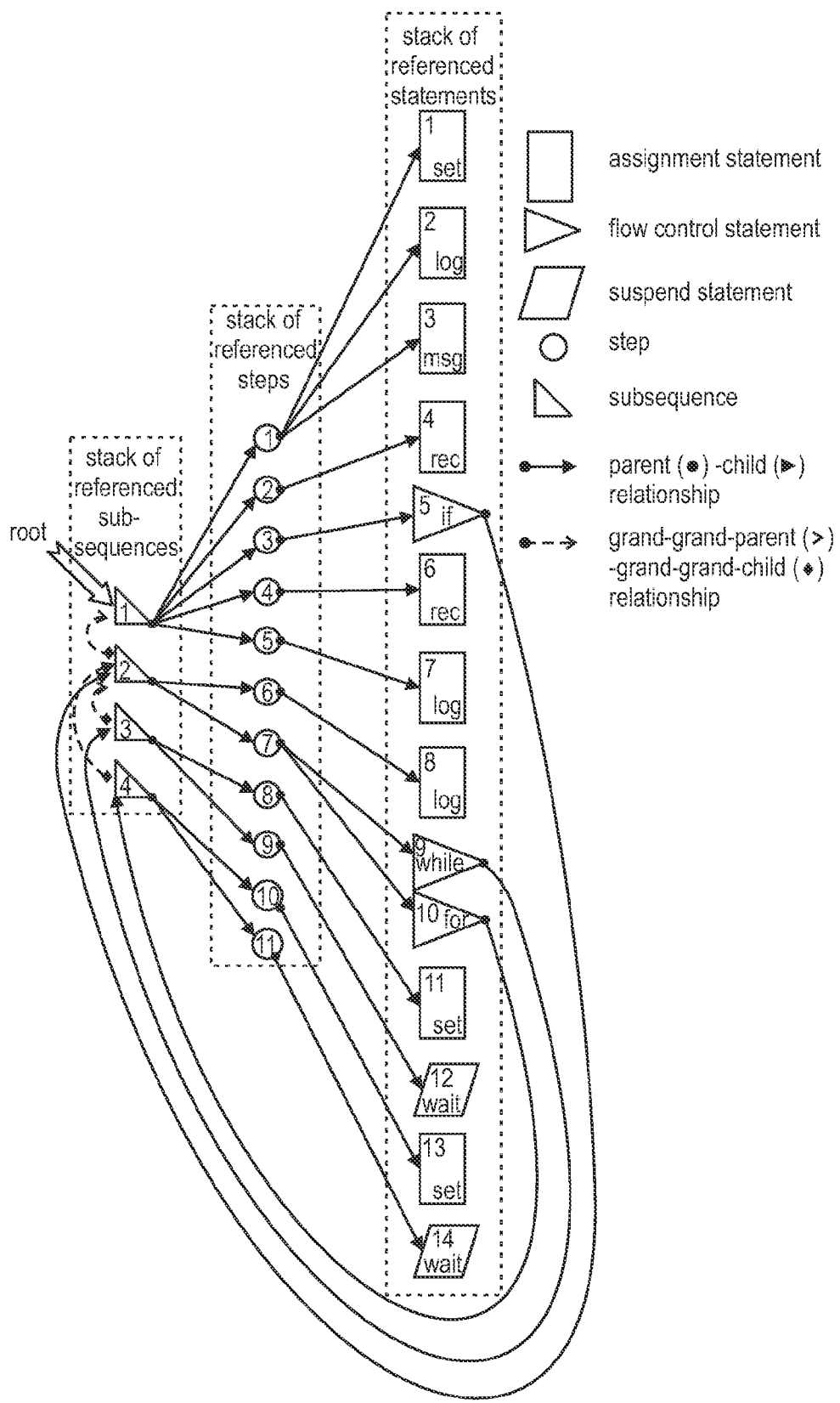
FIG. 3 shows a graphical example of a linearized tree-sequence.

FIG. 3. shows an example of how the subsequence of FIG. 2 could be linearised, wherein the indexes in FIG. 3 refer to the indexes of FIG. 2.

Figure 4:
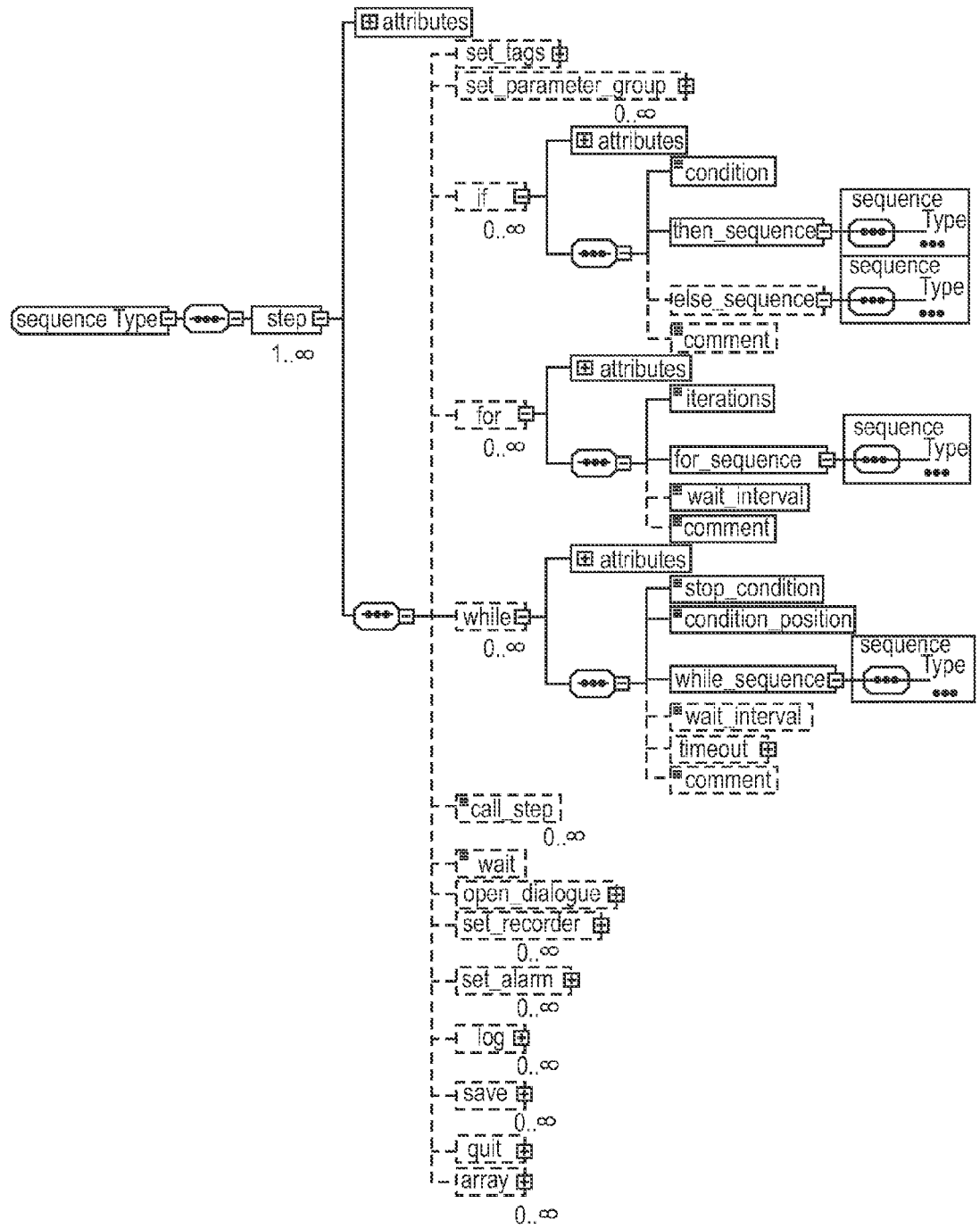
FIG. 4 shows a XMLSpy graphical view of the XML schema of a tree-sequence.
Figure 5:
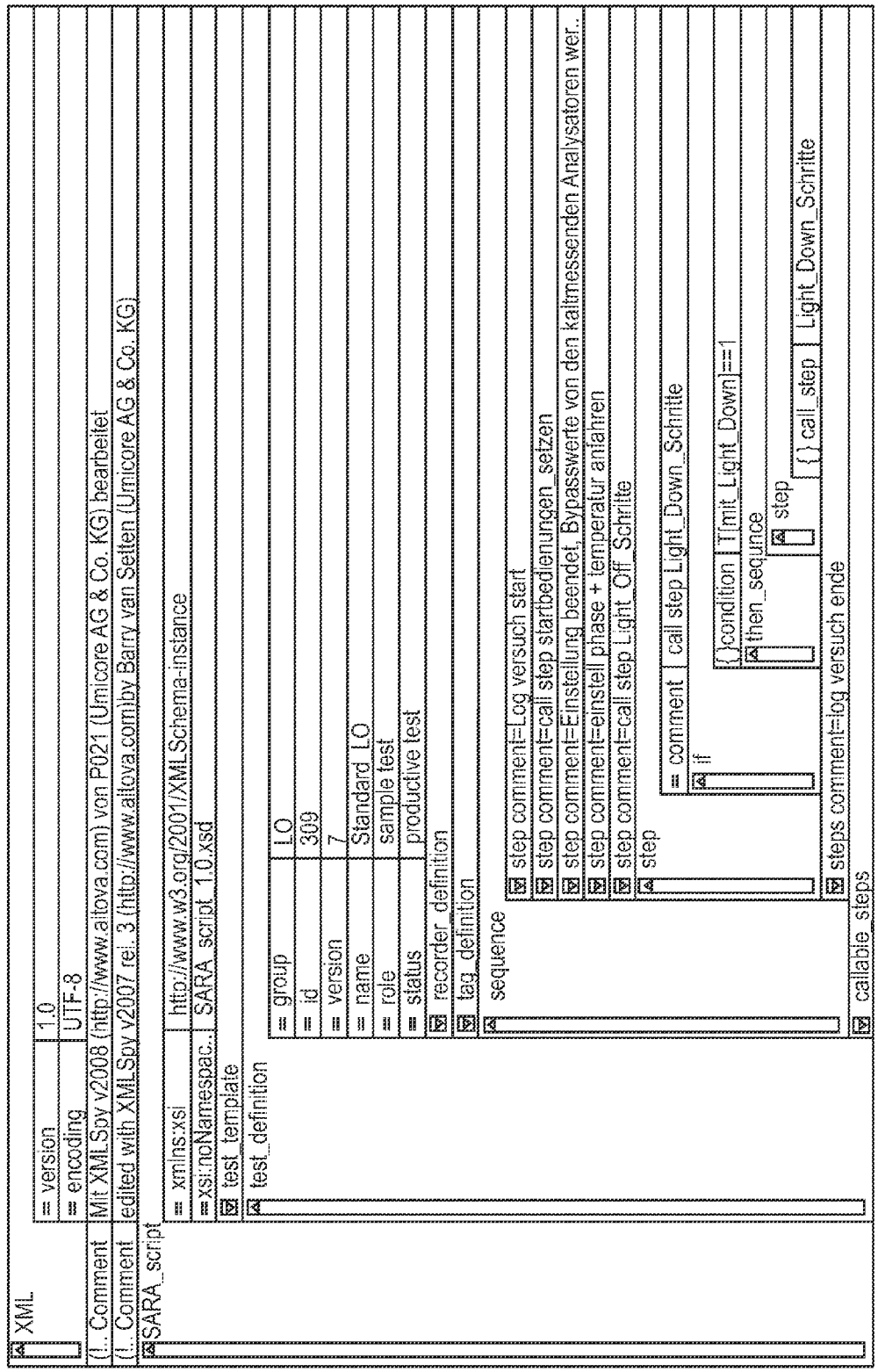
FIG. 5 shows a XMLSpy gridview of a tree sequence definition.

FIGS. 4 illustrates how an XML schema provides convenient means for defining such tree-sequences, by defining a sequenceType type that recursively refers to itself in the if, for, and while control flow statements. Here, FIG. 5 shows the definition of a respective tree sequence using a standard commercial XML editor called XMLSpy.

The parallelization incorporated by the defined tree sequence may in view of performance and cost issues be executed in forms of stacks of referenced data processed in a linear fashion. For this purpose, in order to ensure a sufficient degree of parallelization, the update speed of the sequencer is set higher than the time resolution (sampling-rate) needed for controlling the underlying process, and fast enough for the assignment statements and control flow statements to be executed during suspension of other subsequences.

In the following, examples of tree-sequences (hereinafter termed "test scripts" or "scripts") are provided, which are used in the testing of automotive catalysts, such as by instructing a light-off test in a model gas test bench. However, because the XML script providing a full productive use of such a gas test bench may easily hold more than 17000 lines, only selected parts of the script are discussed in the following, also for improved intelligibility reasons.

Figure 6:
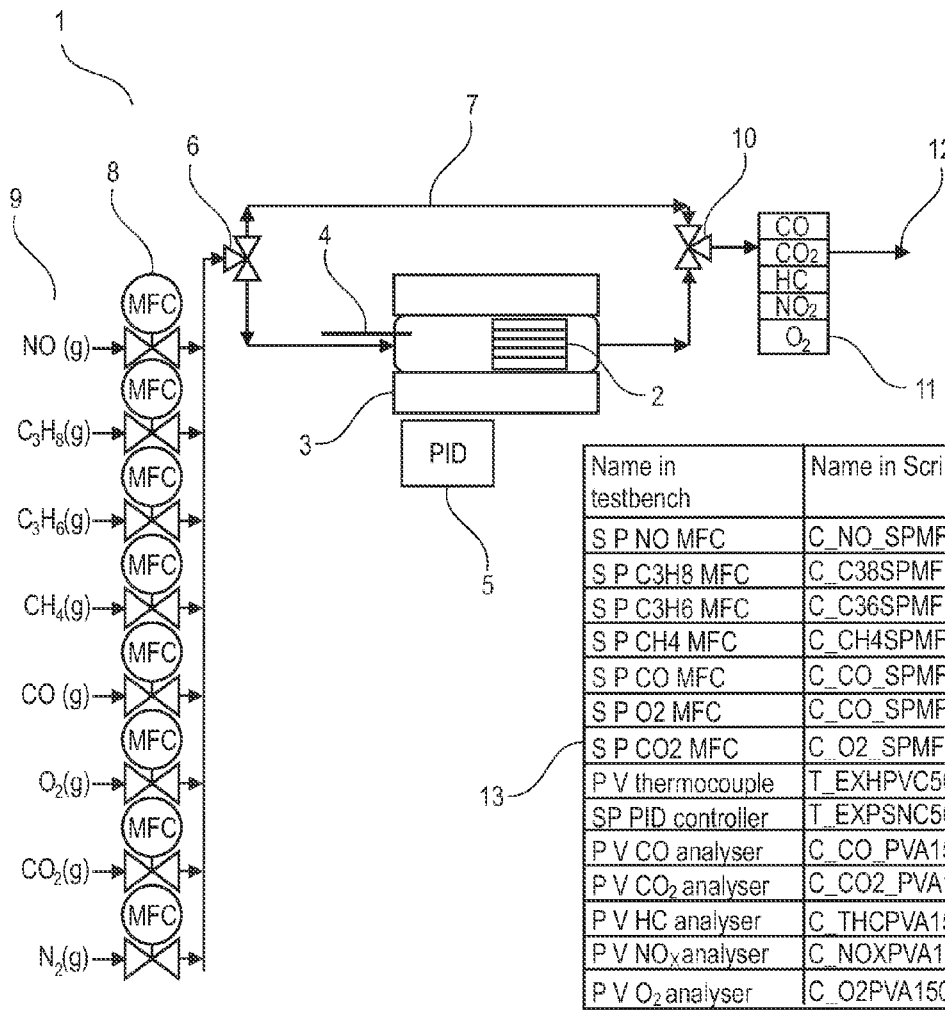
FIG. 6 shows a model gas test bench for testing automotive catalysts according to a first embodiment of the present invention.

In this regard, FIG. 6 shows a simplified scheme of a model gas test bench 1 that is used for performing light-off tests on an automotive catalyst sample 2 provided in a reactor, preferably a glass or steel reactor which is placed in a tube furnace 3. For regulating the temperature of the gas in front of the catalyst, a thermocouple 4 is provided to detect and forward the actual gas temperature value in front of the catalyst to a PID controller 5, which regulates the power output to the furnace 3.

In the model gas test bench 1 illustrated in FIG. 6, a series of mass flow controllers 8 (MFCs) is provided on the left hand side, wherein each mass flow controller 8 controls the mass flow of a defined gas 9 which are collected and synthesized to produce a model exhaust gas. For this purpose, the setpoints of the mass flow controllers 8 can be calibrated or set to control a mass or volume flow. It should be noted in this regard, that the nitrogen gas $N_2$ can, e.g., be used as "balance gas" in the synthesis of model exhaust gas. In FIG. 6, the respective model exhaust gas is collected in the 3-way valve 6 and forwarded to the oven heated reactor 2 or the by-pass line 7. Here, as illustrated in FIG. 6, the model exhaust gas collected in the 3-way valve may bypass the reactor via the reactor by-pass line 7, which is used for performing the gas concentration correction described below. The respective catalyst-treated or by-passed model exhaust gas is then collected in the 3-way valve 10 and fed to the exhaust gas analyzer 11, to detect or measure the different gas concentrations in the output exhaust gas passing towards the output vent 12 of the model gas test bench 1. As known in the art, such a gas analyzer 11 may comprise a number of individual gas analyzers for performing individual gas analysis tasks.

Further, in order to simplify the reading of scripts provided below, a table 13 is provided in FIG. 6, which relates the names of the devices and units provided in FIG. 6 to their corresponding names used in the test scripts detailed below. In this regard, PV relates to a process- or real-value, such as, for example, the thermocouple 4 temperature "PV thermocouple" or the CO gas concentration analysis result "PV CO analyzer" determined by the analyzer 11. Further, SP relates to a setpoint value being assigned to a controller, such as, for example, the setpoint value "SP PID controller" defining the setpoint of the PID controller 5. In this sense, the table 13 relates the respective process and setpoint values to "names" or "tags" used in the following examples of test scripts. Also, although not mentioned in the table, the total gas flow collected in the 3-way valve 6 has been named "VOFEXHSPMF500_" in the following test scripts.

The testing of a catalyst sample 2, using the model gas test bench 1 illustrated in FIG. 6, is executed by the following steps:
1. The catalyst sample 2 is placed in the reactor 3.
2. The mass-flow controllers 8 are each instructed to provide a respective gas type with a respective predefined gas type concentration, which are then collected in the 3-way valve 6 and passed on to the gas-analyzer 11 over the by-pass gas line 7, by-passing the reactor 3 with the catalyst sample 2.
3. The following two steps (a) and (b) are performed in parallel:
   a. Gas concentration correction step : When the gas analyzer 11 measures a deviation from a certain desired gas type concentration, e.g. NO gas, the setpoint of the respective mass flow controller, e.g. "SPNOMFC", is adjusted until the desired exhaust concentrations are detected by the gas analyzer 11. In this sense, the respective mass-flow controllers 8 are adjusted to correct in parallel the gas concentrations of:
      i. NO
      ii. CO
      iii. $CO_2$
      iv. $O_2$
      v. Hydrocarbons
   b. Reactor heat-up step: The heater of the oven heated reactor 3 is started and controlled to reach the desired temperature of the reactor 3. Here, the sequencer waits until the temperature has been stabilized at the desired temperature level.
4. When the desired exhaust gas concentrations and reactor 3 temperature have been successfully regulated in step 3a and step 3b, the 3-way valves 6 and 10 are switched to direct the synthesized exhaust gas into the reactor 3.
5. Next, the temperature in the reactor 3 is raised with a fixed heating-ramp and the experiment is terminated when a predefined end temperature has been reached. During this respective ramp, the concentration of toxic components is monitored with the gas analyzer 11 in order to evaluate properties, such as the performance of the catalyst sample 2.

As mentioned above, the mass flow controllers 8 can be set or calibrated to control a mass or volume flow. In the following test script, the mass flow controller 8 setpoints are defined in volume ppm and volume percent. Based on these definitions, the respective required flows are calculated and the respective mass flow controllers 8 are set accordingly in the test bench system.

FIG. 7 shows a screenshot of an XMLSpy gridview containing a script that describes an automotive test, wherein the sequence steps 1 to 7 are steps performed sequentially, while the callable_steps 1 to 16 represent distant subsequences which may be executed using the "call_step" control flow statement, see, e.g., the "call_step_calibrate massflowcontroller" and "call_step goto_starttemperature" calls sequence step 3 causing both subsequences to run in parallel.

As can be taken from FIG. 7, the following sequence steps 1 to 6 are executed sequentially, wherein the sequence step 3 calls two statements i and ii to be executed in parallel:
1. A message is output to a control panel of the automation system.
2. A step is called that sets all start conditions of the test.
3. Two "call_step" control flow statements execute the two following distant subsequences in parallel:
   i. Call_step "goto_starttemperature" calls the callable_step 4—representing a subsequence which heats up the oven heated reactor 3 and stabilizes the temperature at the inlet of an automotive catalyst. The details of this callable step are discussed below in connection with FIG. 8.
   ii. Call_step "calibrate_massflowcontroller" calls the callable_step 5—representing a subsequence which calibrates several mass flow controllers 8 in parallel. This callable step is discussed below in connection with FIG. 9. Here, some properties are not addressed in detail, because these find analogous counterparts in the thoroughly described callable_step "goto_temperature", with the difference that mass flow controllers 8 are operated instead of setting the temperature of the reactor 3.
4. The calibrated gas is switched to the reactor and light-off test steps are performed.
5. Light-down test steps are performed
6. A message is output to a control panel indicating that the test is completed.

Figure 8:
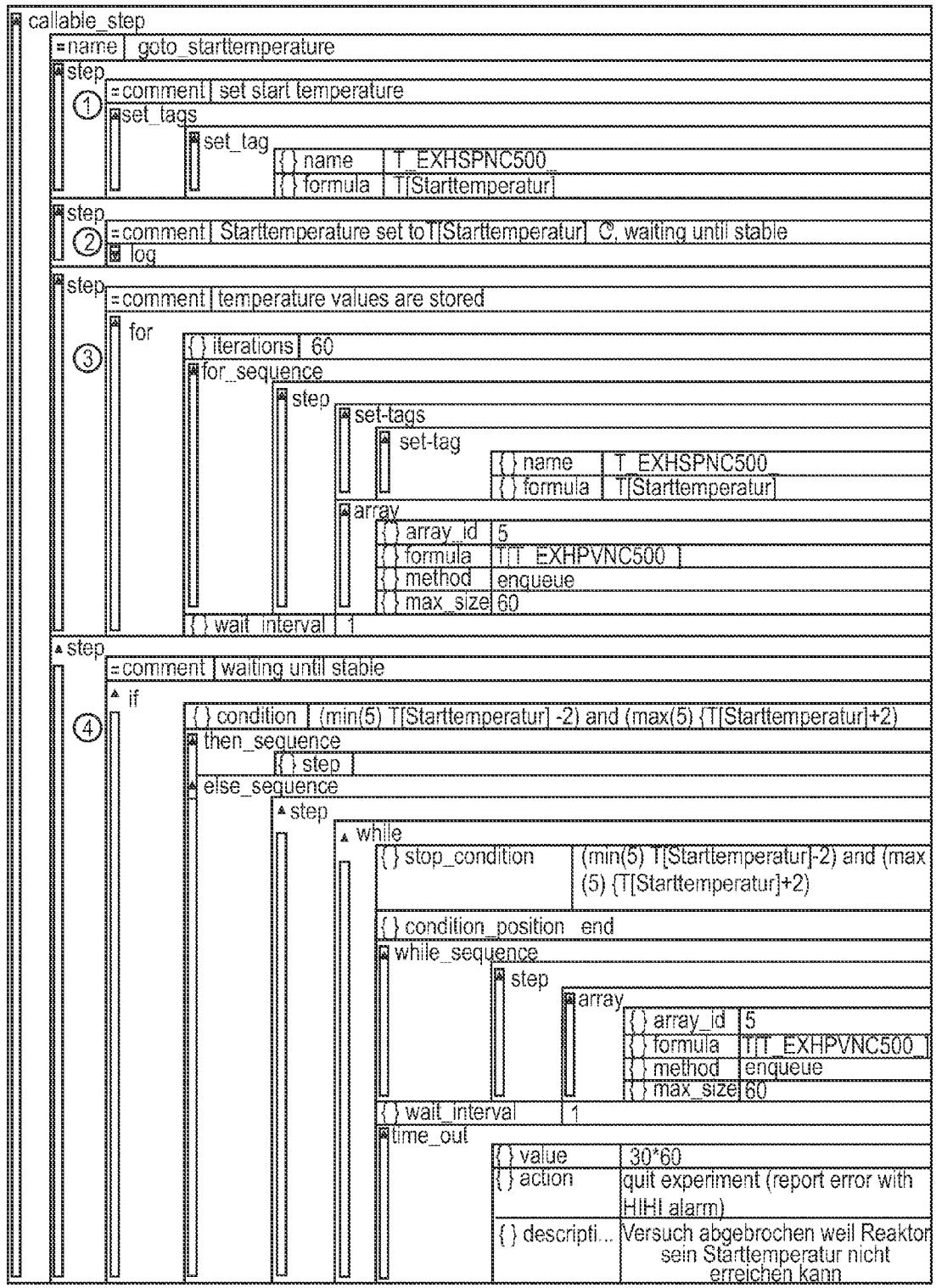
FIG. 8 shows an XMLSpy gridview with the callable_step "goto_starttemperature"

FIG. 8, shows a selected part of the test script defining the distant subsequence "goto_starttemperature", wherein the reactor is heated up and regulated at a predefined temperature level. Here, the following steps are performed in a sequential manner:
1. The tag value "T_EXHSPNC500_" is set to the value of the start parameter ("Starttemperature"). This represent setting the setpoint of the PID controller 5, which is configured to control the temperature in front of an exhaust catalyst sample by means of a furnace.
2. A message is output to a control panel of the automation system.
3. At each second, for 60 seconds, a temperature value "T_EXPPVNC500_" is collected from thereto element 4 and stored in an array having the array_id=5.
4. By means of a while control flow statement, the sequencer is ordered to check every second if the sensed temperature is within a temperature window of "Starttemperatur" +/−2° C. and terminates the while loop if this condition is met. The range of +/−2° C. is checked in the formula "(min(5)}T[Starttemperatur]−2) and (max (5) {T[Starttemperatur]+2" wherein "min" calculates the minimum value in the array with array_id=5 and "max" calculates the maximum value in the array with array_id=5, by means of the "and" function, the window is realized by requiring that the minimal value must be larger than the "Starttemperatur−2" and the maximum value must be smaller than the "Starttemperatur+2". In this context, the characters and '{' and '}' are used in the definition of the while loop condition, wherein '{' means 'smaller than', and '}' means 'larger than'. However, should the while loop condition not be met, a new sensed temperature value "T_EXPPVNC500_" is collected at every second and augmented to the array having the array_id=5, acting as a first-in first out (FIFO) queue.

When the while control flow statement has been successfully terminated (that is, when no timeout error occurs) the temperature in front of the exhaust catalyst sample is considered to be successfully regulated and stabilized.

Similarly, FIG. 9 shows a selected part of the test script defining the subsequence "calibrate_massflowcontroller", which, as detailed above, corrects the mass flow induced by each of the respective mass flow controllers 8. Here, the following steps are executed sequentially:
1. The 'calibration_ready' tag is set to 0, which indicates that the respective calibration is ongoing.
2. The callable_step 'set_valves_in_bypass' is called, which refers to executing the subsequence for switching the 3-way valves 6 and 10 such to use the by-pass line 7 to by-pass the reactor.
3. The calibration accuracy and stabilization times are set.
4. The total exhaust flow is set "VOFEXHSPMF500_"
5. In this step, 6 subsequences are executed in parallel, during which the respective mass flow controller 8 corrections are performed and a running average is calculated to reduce noise measurement signals. This respective running_ average is used in latter steps to evaluate whether the mass flow generated by the respective mass flow controller 8 is or needs to be adapted. The callable_step "C_CO_BYA1500_calibration" is discussed in detail below. It should be noted that these 6 subsequences were put in a callable_step for improved readability of the test script. As a matter of fact, the content of the respective callable_steps could also be implemented as a part of the parent sequence itself without using any callable steps.
6. The 'calibration_ready' tag is set to 1, which indicates that the calibration is successfully completed.

Figure 10:
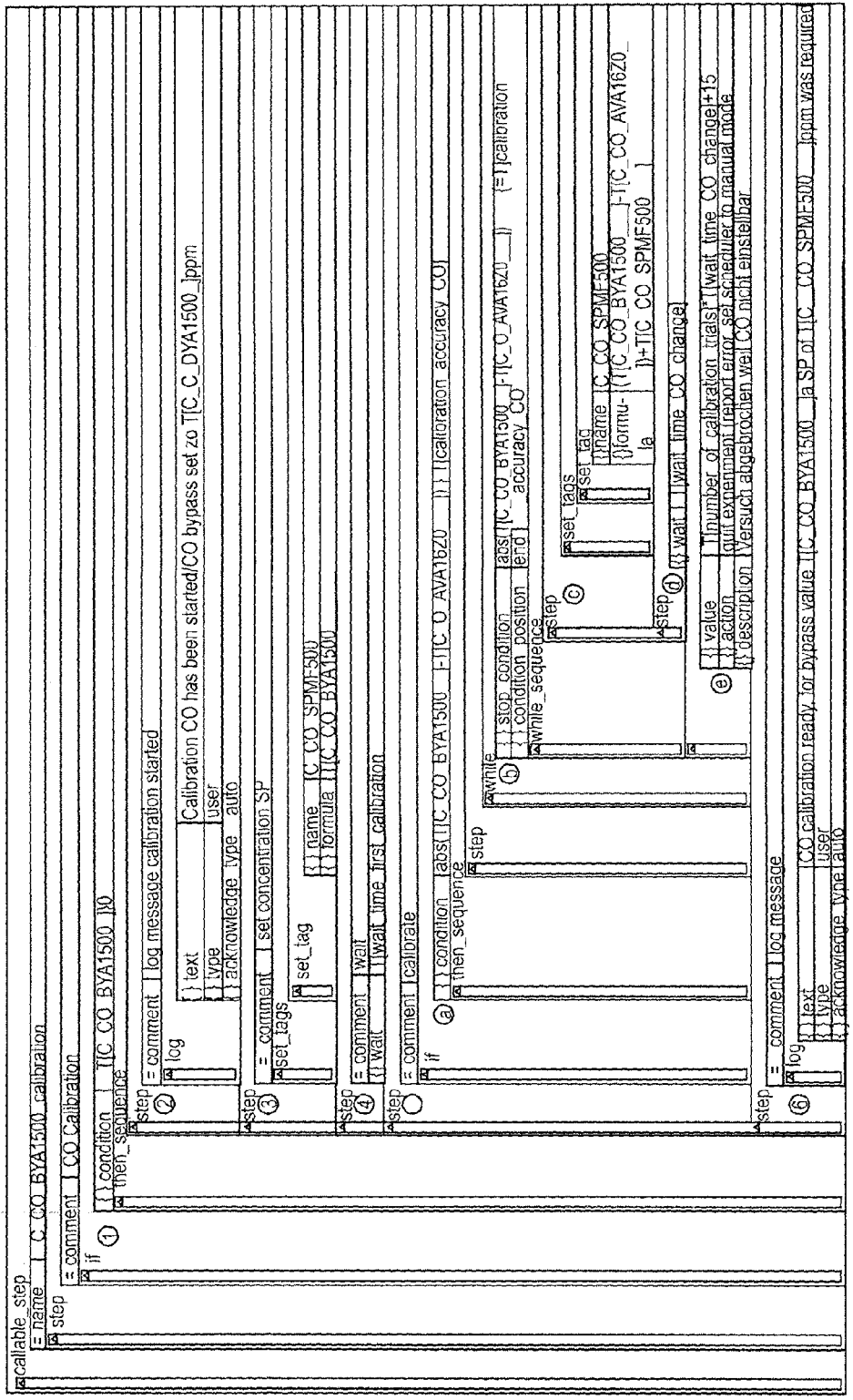
FIG. 10 shows an XMLSpy gridview with the callable_step "C_CO_BYA1500_calibration".

FIG. 10 shows a selected part of the test script defining the distant subsequence "C_COBYA1500_calibration" which corrects the mass flow induced by the CO mass flow controller 8. Here, the following steps are executed sequentially:
1. The CO mass flow controller is calibrated (step 2 and onward), only if the required CO concentration is larger than 0 ppm.
2. A log message is output to the control panel of the test bench automation system.
3. The setpoint of the CO mass flow controller is set in accordance with the required by-pass gas concentration.
4. The sequencer waits for a predefined time, such that the gas line can be flooded with exhaust gas with the appropriate composition.
5. Step 5 performs the actual calibration.
   a. If the absolute value of the difference between the required by-pass concentration and the run-time averaged value measured by the CO analyzer is larger than the required accuracy, then the calibration is started.
   b. A while control flow statement corrects the CO concentration demanded from the CO mass flow controller. The stop condition of the while control flow statement checks at the end of each iteration, if a new iteration is started.
   c. The concentration demanded from the CO mass flow controller is changed.
   d. The subsequence suspends for a pre-defined time, however, although the subsequence waits, other subsequences running in parallel continue their execution.
   e. By means of a timeout the number of calibration iterations is limited.
6. A log message is output to the control panel of the test bench automation system, telling the operator how much the mass flow controller was corrected.

It should be mentioned that the procedure defined in accordance with the script above may be used to compensate for smaller deviations, while, independent of this procedure, the gas analyzers and massflow controllers may be independently calibrated and maintained in separate parts of the test script.

The present invention has now been described with reference to embodiments thereof. It will be apparent to those skilled in the art that many changes can be made in the embodiments described without departing from the scope of the present invention. Thus the scope of the present invention should not be limited to the systems described in this application, but only by systems described by the language of the claims and the equivalents thereof.

The invention claimed is:

1. An automated system comprising a controller and a plant connected by at least one actor unit and at least one sensor unit, wherein the at least one sensor unit collects and outputs information about the plant to the controller and the controller calculates based on the received information a control signal and outputs the control signal to the at least one actor unit, the controller comprising a processing unit to calculate and output the control signal by the controller, wherein the automated system further comprises an interpreter for generating and executing an execution code on the processing unit, wherein the interpreter receives instructions in the form of a tree sequence comprising a subsequence, wherein the subsequence comprises at least one step, wherein the at least one step comprises at least one statement, wherein the at least one statement is a control flow statement used to initiate a new subsequence, the execution code generated and executed by the interpreter causes the processing unit to sequentially execute steps of each subsequence, such that each of the steps is executed by the processing unit until all statements comprised in the respective step have been completed, and statements initiated by the same step are executed in a parallel or in a quasi-parallel manner by the processing unit.

2. The system according to claim 1, wherein the instructions received by the interpreter are defined in an XML document.

3. The system according to claim 1, wherein the control flow statement is defined to initiate the new subsequence in a while-loop, a for-loop, an if-then-else construct, a repeat construct, a select-case construct, a do-while construct, or a subprocedure construct.

4. The system according to claim 1, wherein the plant is an automotive-function test rig, a chemical reactor system, or an analytical instrument.

5. The system according to claim 1, wherein the at least one sensor unit measures a rotational speed, a force, a temperature-value, a concentration of a component, a voltage, a current pressure, a mass, a flow rate, or a logical state of a digital output.

6. The system according to claim 1, wherein the automated system further comprises a display connected to the controller, and the tree sequence comprises at least one statement that outputs a message to the display for display to a human operator of the automated system.

7. The system according to claim 1, wherein the generation of an execution code by the interpreter involves an intermediate step of generating an intermediate representation code.

8. The system according to claim 1, wherein the tree sequence received by the interpreter represents a source code which the interpreter executes directly on the processing unit.

9. The system according to claim 1, wherein the interpreter is a linearizer which generates and executes a linearized execution code based on the received tree sequence.

10. The system according to claim 9, wherein the linearizer generates linear stacks of referenced data from tree sequences, and executes the linear stacks of referenced data on the processing unit in a linear fashion with a high-speed processing rate enabling the quasi-parallel processing of the statements comprised by different subsequences initiated by control flow statements that are contained in the respective step.

11. The system according to claim 1, wherein the interpreter executes a precompiled code.

12. The system according to claim 1, wherein the interpreter receives instructions in form of a plurality of tree sequences, wherein each tree sequence comprises a root sequence and whereby the processing unit executes the multiple tree sequences in parallel.

13. The system according to claim 1, wherein the processing unit runs in a real-time kernel or a real-time operating system.

14. The system according to claim 1, wherein the new subsequence initiated by the control flow statement comprises at least one step, wherein the at least one step comprises at least one statement.

15. The system according to claim 1, wherein the subsequence further comprises an assignment statement defining computational or peripheral procedures to be performed by said controller, and a suspend statement used to suspend execution at a position of the suspend statement without suspending other statements comprised in the respective step.

16. A method for automating a system comprising a controller with a processing unit and a plant connected by at least one actor unit and at least one sensor unit, wherein the at least one sensor unit collects and outputs information about the plant to the controller and the controller uses the processing unit to calculate a control signal based on the received information and to output the calculated control signal to the at least one actor unit, wherein the system comprises an interpreter that receives instructions in the form of a tree sequence comprising a subsequence, wherein the subsequence comprises at least one step, wherein the at least one step comprises at least one statement, wherein the at least one statement is a control flow statement used to initiate a new subsequence, based on the received instructions, the interpreter generates and executes an execution code on the processing unit, by having the processing unit sequentially execute steps of each subsequence, such that each of the steps is executed until all statements comprised in the respective step have been completed, and statements initiated by the same step are executed in a parallel or in a quasi-parallel manner.

17. A non-transitory computer readable medium having instructions adapted to cause a computer to control the interpreter to perform the generation and execution of an execution code for automating the system in accordance with the method of claim 16.

18. A non-transitory computer readable medium having instructions adapted to cause the interpreter, via instructions in the form of the tree sequence receivable by the interpreter, to automate the system in accordance with the method of claim 16.

19. A non-transitory computer readable medium having instructions adapted to cause a computer to control the interpreter to receive instructions in the form of at least one tree sequence and to perform the generation and execution of an execution code for automating the system in accordance with the method of claim 16.

20. The method according to claim 16, wherein the instructions received by the interpreter are defined in an XML document.

21. The method according to claim 16, wherein the generation of an execution code by the interpreter involves an intermediate step of generating an intermediate representation code.

22. The method according to claim 16, wherein the interpreter receives instructions in form of a plurality of tree sequences, wherein each tree sequence comprises a root sequence and whereby the processing unit executes the multiple tree sequences in parallel.

23. The method according to claim 16, wherein the new subsequence initiated by the control flow statement comprises at least one step, wherein the at least one step comprises at least one statement.

24. The method according to claim 16, wherein the subsequence further comprises an assignment statement defining computational or peripheral procedures to be performed by said controller, and a suspend statement used to suspend execution at a position of the suspend statement without suspending other statements comprised in the respective step.

* * * * *